(12) United States Patent
Story

(10) Patent No.: US 10,156,261 B2
(45) Date of Patent: Dec. 18, 2018

(54) DRIVE SHAFT SPLINT JOINT INCLUDING BUSHING RECEPTACLE WITH NON-TAPERED INTERIOR

(71) Applicant: Jason Story, Pasco, WA (US)

(72) Inventor: Jason Story, Pasco, WA (US)

( * ) Notice: Subject to any disclaimer, the term of this patent is extended or adjusted under 35 U.S.C. 154(b) by 272 days.

(21) Appl. No.: 15/087,903

(22) Filed: Mar. 31, 2016

(65) Prior Publication Data

US 2017/0284473 A1 Oct. 5, 2017

(51) Int. Cl.
*F16D 1/097* (2006.01)
*F16D 1/08* (2006.01)

(52) U.S. Cl.
CPC ........... *F16D 1/097* (2013.01); *F16D 1/0876* (2013.01)

(58) Field of Classification Search
CPC ..... F16D 1/04; F16D 1/05; F16D 1/06; F16D 1/092; F16D 1/093; F16D 1/094; F16D 1/096; Y10T 403/7056; Y10T 403/7058; Y10T 403/7067; Y10T 403/7064; Y10T 403/7069; Y10T 403/1641
See application file for complete search history.

(56) References Cited

U.S. PATENT DOCUMENTS

| | | | | |
|---|---|---|---|---|
| 4,304,502 A | * | 12/1981 | Stratienko | F16D 1/094 403/370 |
| 4,364,687 A | * | 12/1982 | Adell | F16D 1/094 403/16 |
| 4,471,846 A | * | 9/1984 | Mullenberg | F16D 1/093 24/136 B |
| 4,494,889 A | * | 1/1985 | Thompson | F16D 1/096 403/16 |
| 4,525,094 A | * | 6/1985 | Johnson | F16D 1/096 403/11 |
| 4,557,621 A | * | 12/1985 | Mullenberg | F16D 1/093 403/16 |
| 4,655,630 A | * | 4/1987 | Rinehart | B23B 31/11 403/342 |
| 4,988,231 A | * | 1/1991 | Pettit | F16B 3/04 285/276 |
| 5,076,544 A | * | 12/1991 | Mueller | B66D 1/30 254/266 |
| 5,174,680 A | * | 12/1992 | Nakamura | B60B 37/04 301/111.01 |
| 5,360,283 A | * | 11/1994 | Browning | F16D 1/095 403/261 |
| 6,065,407 A | * | 5/2000 | Wang | A47B 57/545 108/110 |

(Continued)

*Primary Examiner* — Daniel J Wiley

(57) ABSTRACT

Claimed is a splint joint for a drive shaft including a receptacle with an interior and with a drive shaft extending from the receptacle. A bushing having a bushing body is inserted into the receptacle interior and the receptacle and bushing are immovably affixed in resistance to rotation by friction. The bushing is affixed to a bushing ring with the combined bushing and bushing ring inserted into the receptacle. Machine bolts draw bushing and bushing ring together. The bushing and the bushing ring each have a single split and both have a spring function. As the bushing and bushing ring are drawn together the bushing ring is expanded into friction contact with the bushing receptacle interior and the bushing is compressed into friction contact with the bushing ring. Push bolts allow the bushing to be urged away from the bushing ring.

8 Claims, 8 Drawing Sheets

(56) References Cited

U.S. PATENT DOCUMENTS

| | | | | |
|---|---|---|---|---|
| 6,309,136 | B1* | 10/2001 | Kellenberger | F16D 1/094 403/335 |
| 6,446,541 | B1* | 9/2002 | Eriksson | F16D 1/05 403/367 |
| 6,736,027 | B2* | 5/2004 | Ostling | F16D 1/094 403/374.1 |
| 7,500,543 | B2* | 3/2009 | Doran | B66B 11/0438 187/250 |
| 8,429,804 | B2* | 4/2013 | Anderson, III | F16D 1/05 29/456 |
| 8,657,544 | B2* | 2/2014 | Liu | F16D 1/096 411/266 |
| 8,782,866 | B2* | 7/2014 | Anderson, III | F16D 1/05 29/407.1 |
| 8,961,063 | B2* | 2/2015 | Anderson, III | F16D 1/094 285/323 |
| 2004/0096271 | A1* | 5/2004 | Peter | F16B 7/025 403/374.3 |
| 2009/0087258 | A1* | 4/2009 | McCabe | F16B 3/06 403/370 |

* cited by examiner

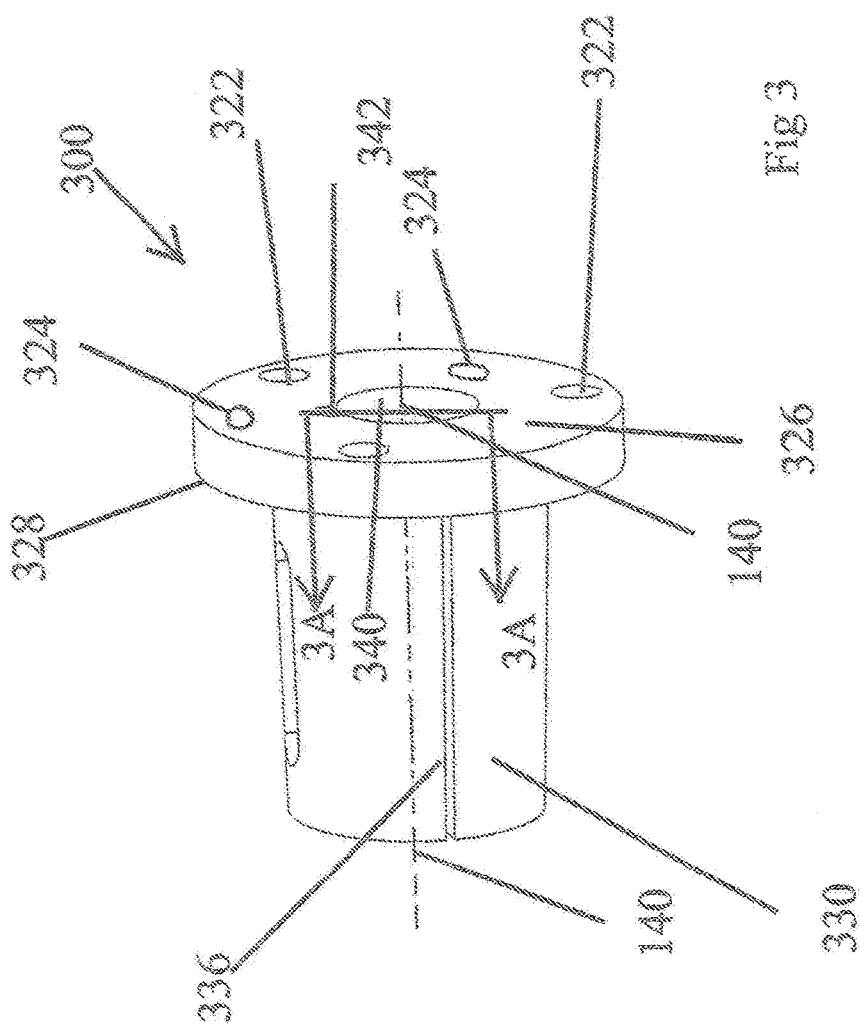

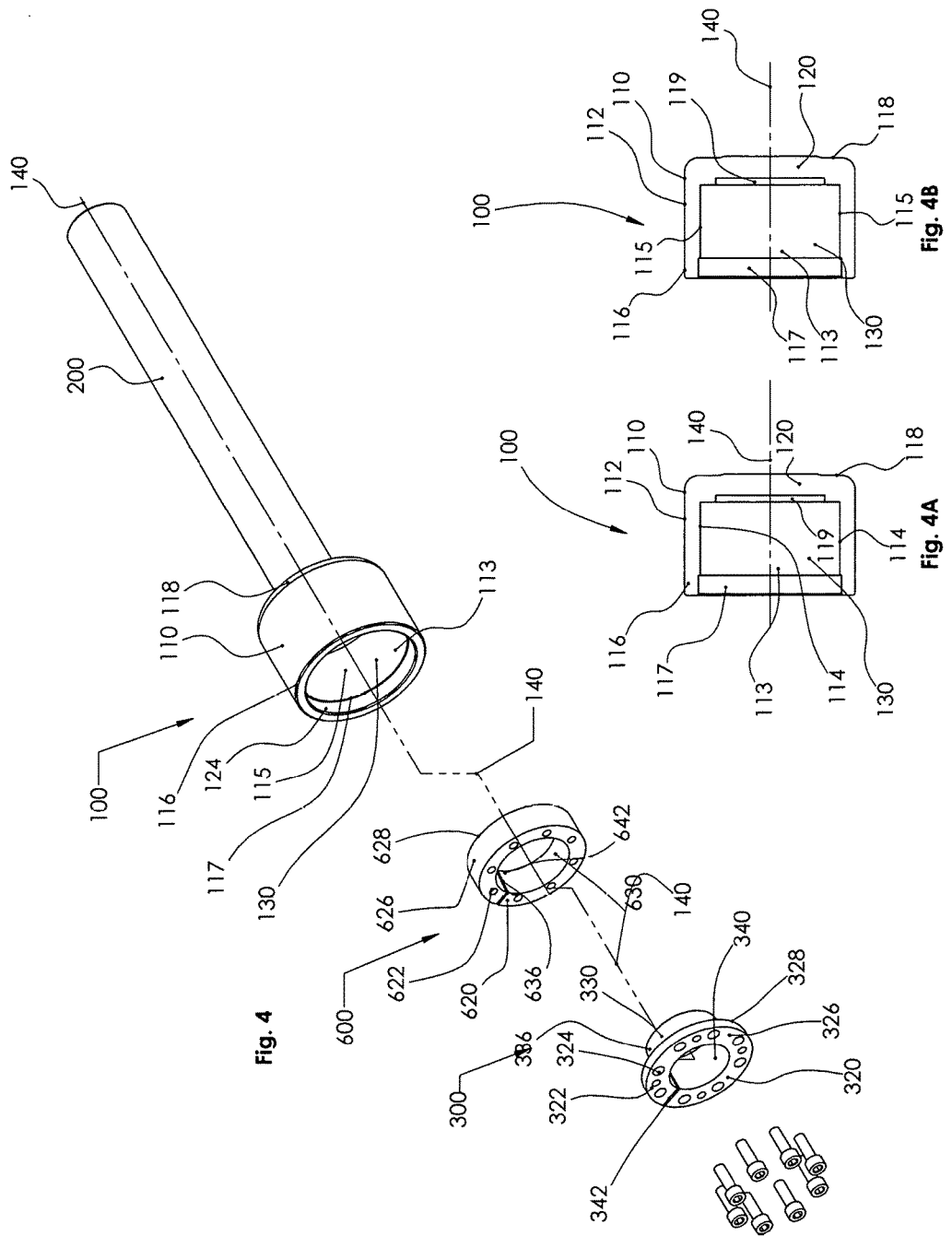

DRIVE SHAFT SPLINT JOINT INCLUDING BUSHING RECEPTACLE WITH NON-TAPERED INTERIOR

FIELD OF THE INVENTION

This is a Continuation-in-Part pending from patent application Ser. No. 14/256,851 filed Apr. 18, 2014, titled "A DRIVE SHAFT SPLINT JOINT" to inventor STORY. THE CIP Application Specification and Claims are added to the original application Specification and Claims and ARE DISPLAYED IN BOLD PRINT. This invention relates to a splint joint for a shaft. More specifically the invention is a splint joint for a drive shaft with the bushing receptacle (100) having a bushing receptacle body non-tapered interior (115) parallel to a bushing receptacle and shaft center line (140). In this variant a bushing ring (600) is intermediate a bushing (300) and the bushing receptacle (100).

BACKGROUND OF THE INVENTION

The need to adjust, move or remove a drive shaft can facilitate repair of equipment and installation of new equipment. The ability to disassemble or separate a drive shaft or drive shaft sections can assist in repair and installation of equipment.

SUMMARY OF THE INVENTION

The Drive Shaft Splint Joint is a receptacle (100) with a bushing receptacle body interior (113) having a receptacle tapered interior (114) or, in an obvious variant, having a bushing receptacle non-tapered interior (115) and with a drive shaft extending from the receptacle. A bushing is inserted into the receptacle interior and the bushing receptacle and bushing are irremovably affixed with bolts. The bushing has a keyed aperture which receives a keyway drive shaft. Push bolts allow the bushing to be urged away from the receptacle allowing the drive shaft to be disassembled.

Alternatively, a bushing (300) is removably affixed to a bushing ring (600) and the combined bushing (300) and bushing ring (600) is inserted into the bushing receptacle (100) and the bushing receptacle (100) and the combined bushing (300) and bushing ring (600) are inhibited by friction fit from rotation relative to the other. Persons of ordinary skill in key arts recognize that the bushing receptacle may secure a bushing ring (600) and a bushing (300) from rotation via a key or keyway or with friction and that the drive shaft extending from the bushing receptacle may likewise be keyed, be secured to a rotating drive by friction or be received into a bearing. Push bolts allow the bushing to be urged away from the bushing ring and the receptacle allowing the drive shaft to be disassembled.

In the alternative variant of this CIP the Drive Shaft Splint Joint receptacle (100) has a bushing receptacle non-tapered interior (115). This variant has a bushing receptacle body (110) bushing receptacle body non tapered interior (115) where the bushing receptacle body non tapered interior (115) is parallel to a bushing receptacle and shaft center line (140).

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein:

FIGS. 3, 3A and 3B shows a bushing (300), a bushing cap (320), at least one bushing cap machine bolt hole (322), at least one bushing cap push bolt tapped hole (324), and the bushing taper body split (336). FIGS. 3A and 3B are sections from FIG. 3 illustrating the bushing drive shaft aperture key (342) extending, in FIG. 3A, part way from the bushing cap top surface (326) toward the bushing cap bottom surface (328), and in FIG. 3B, from the said bushing cap top surface (326) to the bushing cap bottom surface (328).

FIG. 4 illustrates a Splint joint (1), a bushing receptacle (100), a bushing receptacle body (110), a bushing receptacle body exterior (112), a bushing receptacle body interior (113).

FIG. 4A is section A from FIG. 4 showing a bushing receptacle (100).

FIG. 4B is section B from FIG. 4 showing a bushing receptacle (100).

DETAILED DESCRIPTION OF THE INVENTION

Figure 1:
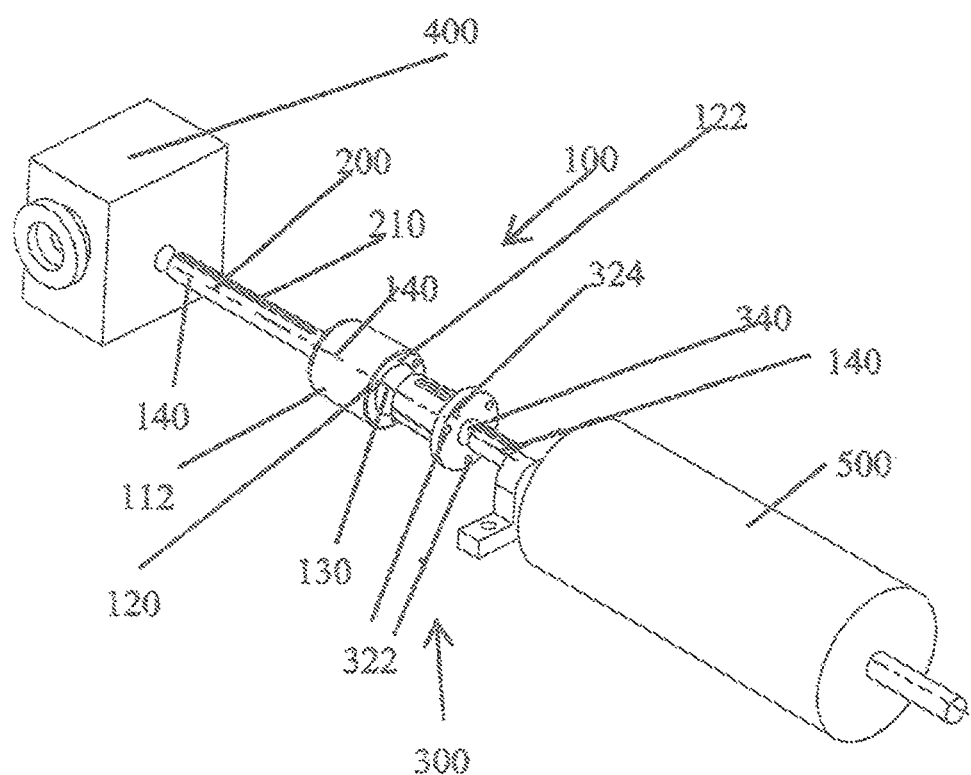
FIG. 1 illustrates a bushing receptacle (100), a bushing (300) having a bushing cap (320), a drive device (400), a driven device (500), a driven device drive shaft (510) and a driven device drive shaft keyway (520).
Figure 2:
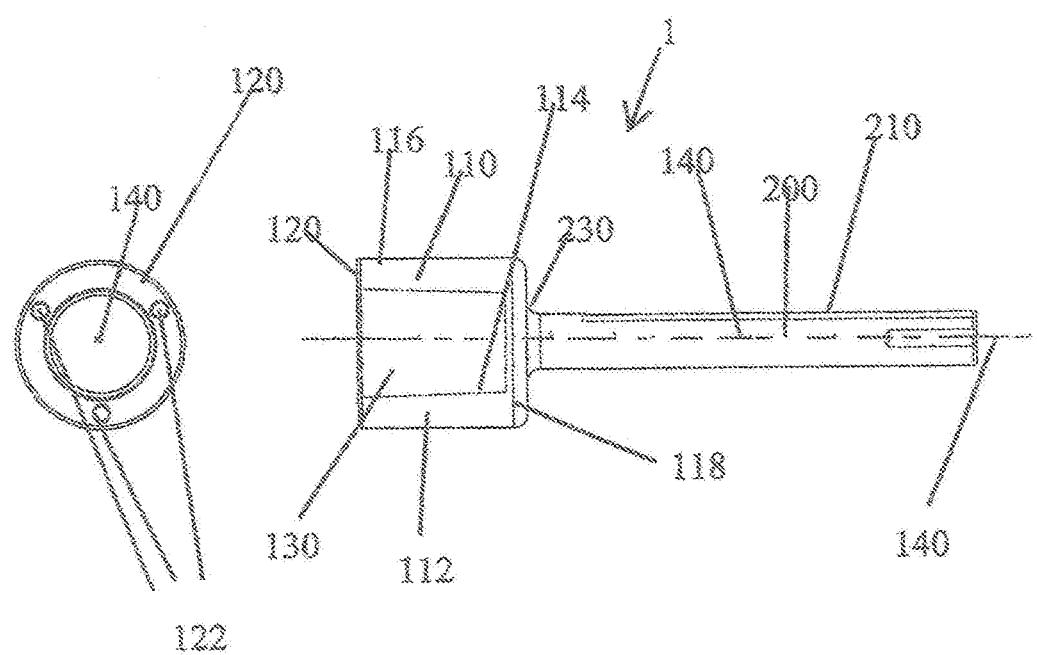
FIGS. 2 and 2A show the Splint joint (1) illustrating the bushing receptacle (100), the bushing receptacle body (110), the bushing receptacle body exterior (112), the bushing receptacle body interior (114).
Figure 2A:
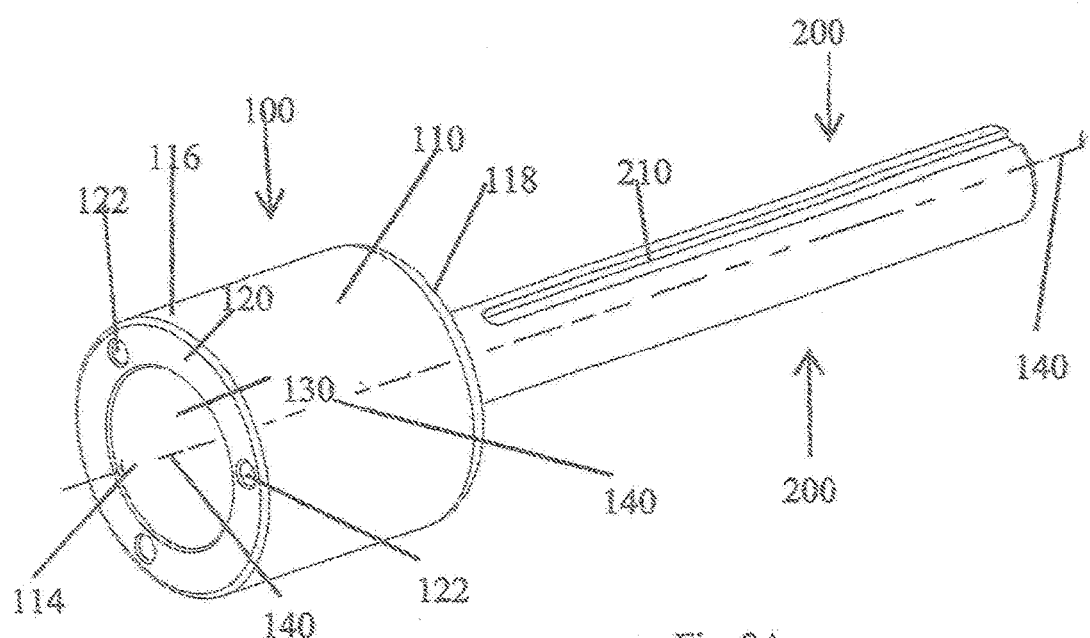

The splint joint (1), as seen in FIGS. 1, 2, and 2A for a shaft comprises a bushing receptacle (100) having a bushing receptacle body (110); said bushing receptacle (100) having a bushing receptacle body exterior (112), a bushing receptacle body tapered interior (114), a bushing receptacle top (116), a bushing receptacle bottom (118) distal from the said bushing receptacle top (116), a generally planar receptacle bushing mating surface (120) at the said bushing receptacle top (116), at least one bushing receptacle tapped hole (122) at the said bushing mating surface (120) penetrating the said bushing receptacle body (110). A person of ordinary skill in mechanical arts will recognize that the "bushing receptacle body tapered interior (114)" may not be tapered" but that a tapered interior will provide from additional resistance to torque and rotation of the said splint joint (1) relative to an attached bushing (300).

As seen in FIGS. 1, 2 and 2A, a shaft (200) extends outwardly from and is immovably affixed, by a drive shaft connection (230), to the said bushing receptacle bottom (118). Those of ordinary skills in the drive shaft arts will understand the variety of ways that the shaft (200) may be immovably affixed to the said bushing receptacle (100) including welding. However, the preferred formation of the bushing receptacle (100) and extending shaft (200) is by machining from a single piece of rigid material including generally carbon or stainless steel. The shaft (200) is in alignment with and concentrically sharing a bushing receptacle and shaft center line (140) extending from the said bushing receptacle interior (130).

Figure 3A:
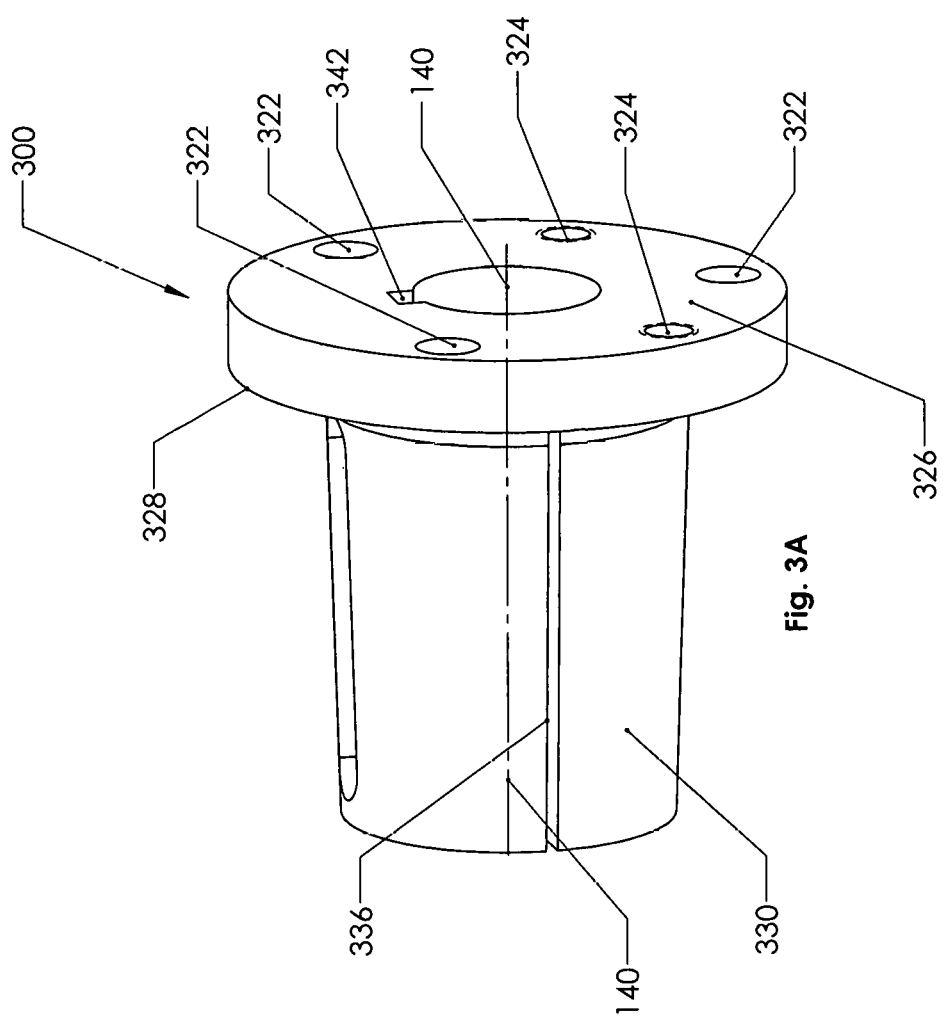
Figure 3B:
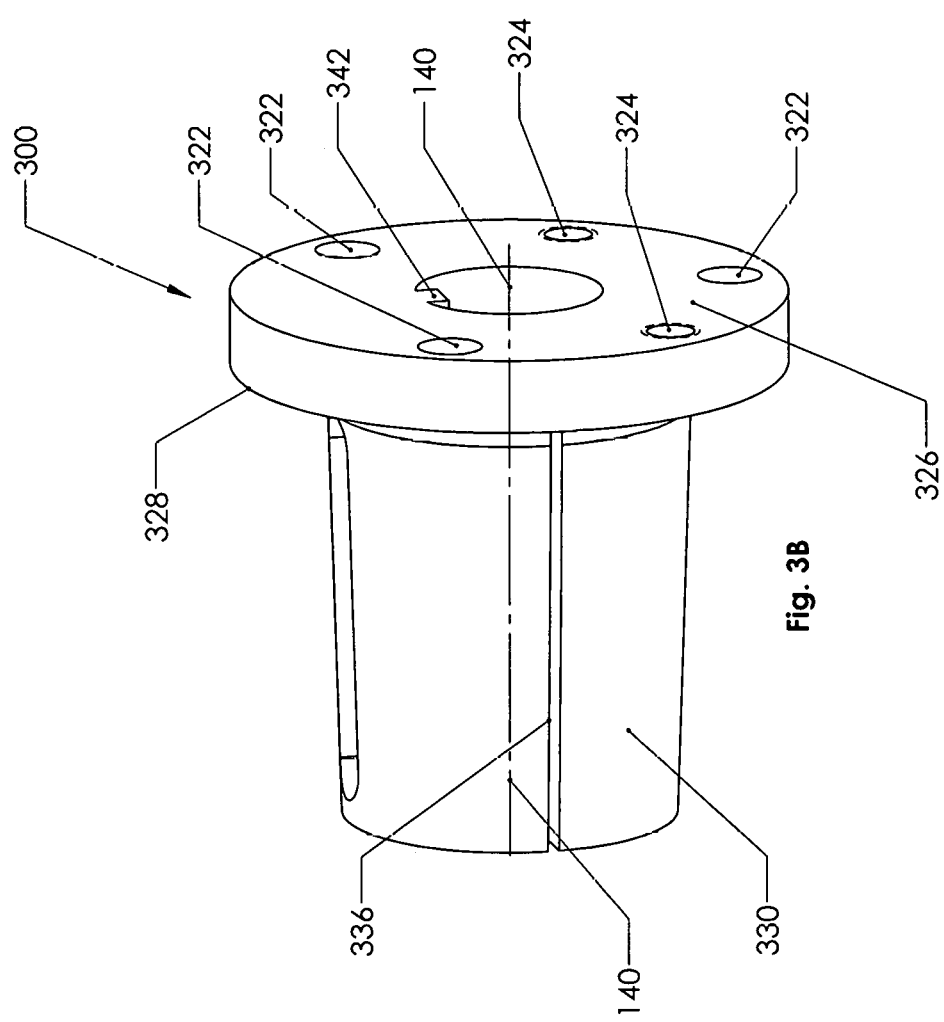

Seen in FIGS. 3, 3A and 3B is a bushing (300) having a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle and shaft center line (140).

Seen in FIGS. 3, 3A and 3B, at least one bushing cap machine bolt hole (322) penetrates the said bushing cap (320) and is in alignment with the at least one bushing receptacle tapped hole (122). The at least one bushing cap push bolt tapped hole (324) extends from said bushing cap top surface (326) and through the said bushing cap bottom surface (328). The said at least one bushing cap push bolt tapped hole (324) is aligned to contact the said bushing mating surface (120); and a bushing drive shaft aperture (340) is sized to receive a shaft (200) and extends from said bushing cap top surface (326) through the said bushing cap bottom surface (328) and is concentrically aligned with the said bushing receptacle and shaft center line (140).

As illustrated in FIGS. 3, 3A and 3B is the bushing taper body (330) extends outwardly from the said bushing cap bottom surface (328); the bushing taper body (330) is sized to be slidably inserted into and extracted from the bushing receptacle body tapered interior (114); the bushing taper body (330) having a irremovably friction fit within the bushing receptacle body tapered interior (114); the bushing taper body (330) and the bushing receptacle body tapered interior (114) having generally the same tapered ratio; the said bushing taper body split (336) is narrow proximal the said bushing cap bottom surface (328) and is wider distal to the said bushing cap bottom surface (328). The said bushing taper body (330) has a spring function allowing the bushing taper body split (336) to close as the said bushing taper body (330) is inserted into the said bushing receptacle body tapered interior (114). In an alternative embodiment the said bushing body (330) will not be tapered. In an additional alternative embodiment there is no bushing taper body (330).

As seen in FIGS. 3, 3A and 3B, the said bushing cap bottom surface (328) is generally parallel to the said bushing receptacle mating surface (120); the at least one bushing cap machine bolt hole (322) is aligned with the said at least one bushing receptacle tapped hole (122) to receive machine screws and secure the said bushing receptacle (100) and the said bushing (300) from movement relative to the other during rotation.

As shown in FIGS. 3, 3A and 3B there is at least one bushing cap push bolt tapped hole (324) is positioned so that a threaded push bolt received by the at least one bushing cap push bolt threaded hole (324) will contact the bushing receptacle mating surface (120) and thereby urge the said bushing (300) away from and out of the said bushing receptacle (100) when the splint joint (1) disassembly is required.

Seen in FIGS. 3, 3A and 3B is a preferred embodiment of the Splint Joint (1) the shaft (200) is a drive shaft (200) having a drive shaft key way (210); the said drive shaft (200) is driven by a drive device (400); the at least one bushing receptacle tapped hole (122) at the said bushing mating surface (120) is at least two bushing receptacle tapped holes (122); and the said at least one bushing cap push bolt tapped hole (324) is at least two bushing cap push bolt tapped holes (324) spaced apart and aligned to contact the said bushing mating surface (120); and the said bushing drive shaft aperture (340) has a bushing drive shaft aperture key (342) therein to be received into a driven device drive shaft key way (520) of a drive shaft (200) which drives a driven device (500). In the preferred embodiment the bushing drive shaft aperture key (342) extends within the said bushing drive shaft aperture (340) from the said bushing cap top surface (326) to the said bushing cap bottom surface (328). In the preferred embodiment a drive shaft (200) having a said driven device drive shaft key way (520) will extend no further into the said bushing taper body (330) than from the said bushing cap top surface (326) to the said bushing cap bottom surface (328). This preferred embodiment will allow greatest movement of the said drive shaft (200) into the said bushing taper body (330) there by facilitating disassembly of the drive shaft splint joint (1). In an alternative embodiment a drive shaft (200) having a said driven device drive shaft key way (520) will extend into the bushing cap (324) and toward the said bushing cap bottom surface (328) but will be distal to the said bushing cap bottom surface (328).

Additionally, FIGS. 3, 3A and 3B in the preferred embodiment of the Splint Joint (1), the at least two bushing receptacle tapped holes (122) at the said bushing mating surface (120) is at least three bushing receptacle tapped holes (122) spaced equidistantly; the said at least one bushing cap push bolt tapped hole (324) is at least two bushing cap push bolt tapped holes (324) spaced apart 180 degrees.

An obvious variant of the Splint Joint (1) is seen in FIGS. 4, 4A and 4B showing a bushing receptacle (100), a bushing receptacle body (110), a bushing receptacle body exterior (112), a bushing receptacle body tapered interior (114), a bushing receptacle body non tapered interior (115), a bushing receptacle top (116), a bushing receptacle seal lip (117), a bushing receptacle bottom (118), a bushing receptacle drive shaft aperture key (124), a bushing receptacle interior (130), and a bushing receptacle and shaft center line (140). Also illustrated in FIG. 4A is section A-A from FIG. 4 showing the bushing receptacle body tapered interior (114) and in FIG. 4B is section B-B from FIG. 4 showing a bushing receptacle body non tapered interior (115).

Also seen in FIG. 4 is a bushing ring (600) having a bushing ring cap (620), a bushing ring cap machine bolt hole (622), bushing ring cap push bolt tapped hole (624), a bushing ring cap top surface (626), a bushing ring cap bottom surface (628), a bushing ring drive shaft aperture (640), a bushing ring drive shaft aperture key (642) and a bushing ring taper body (630).

Also illustrated in FIG. 4 is a bushing (300) having a bushing cap (320), a bushing cap machine bolt hole (322), bushing cap push bolt tapped hole (324), a bushing cap top surface (326), bushing cap bottom surface (328), a bushing drive shaft aperture (340), a bushing drive shaft aperture key (342), a bushing taper body (330) and a bushing taper body split (336).

Figure 4C:
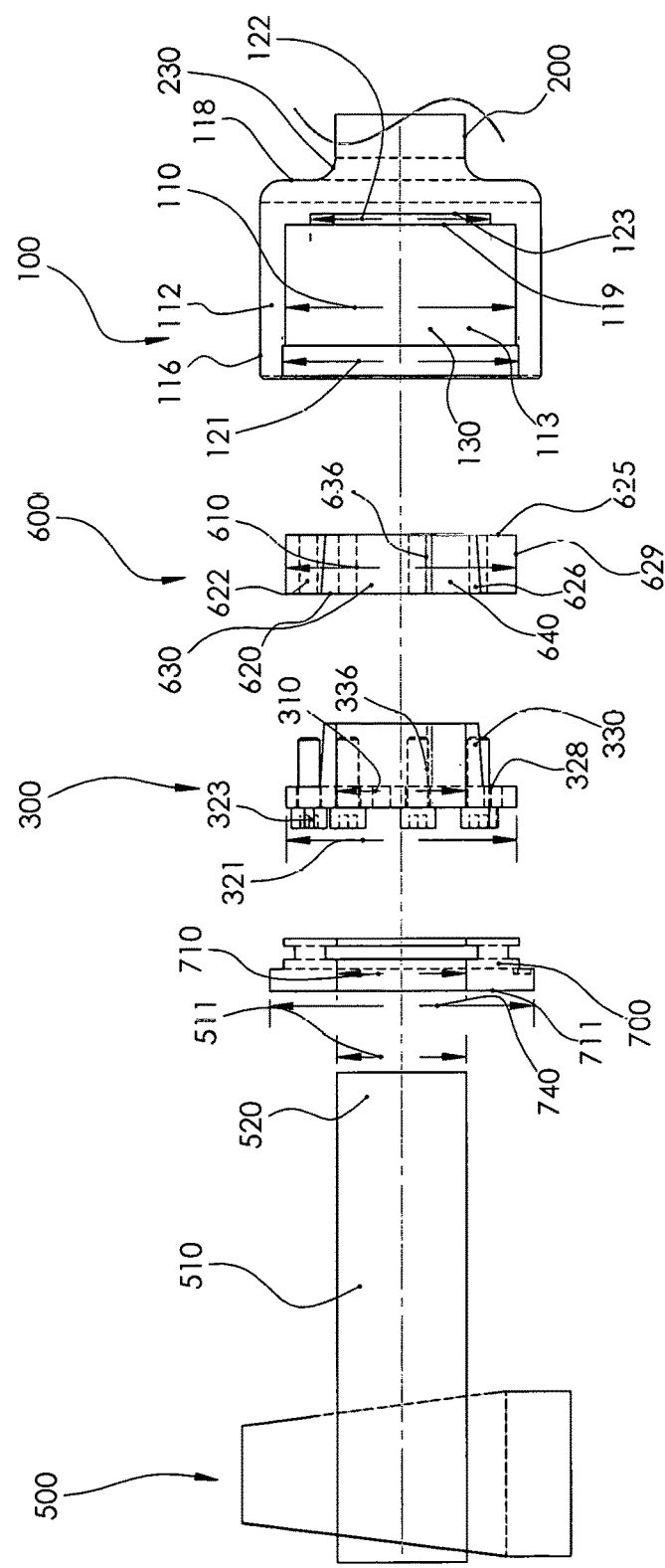
FIG. 4C is section C from FIG. 4 illustrating the entire structure of the Drive Shaft Splint Joint including bushing receptacle with non-Tapered Interior. Also seen is a driven device (500), a driven device drive shaft (510) and a driven device drive shaft keyway (520), a seal (700), a seal aperture (740), a seal aperture diameter (710), and a seal outside diameter (711).

FIG. 4C is section C from FIG. 4 illustrating and exploded view of the entire structure of the Drive Shaft Splint Joint including bushing receptacle (100), drive shaft (200), bushing ring (600), bushing (300), seal (700) and driven device drive shaft (510).

Seen in FIG. 4C is the bushing receptacle (100) which is constructed from a rigid material including stainless steel and, for some applications, rigid plastics. Stainless steel will be preferred when used in food production or industries intent on controlling contamination in that the bushing (300), bushing ring (600), driven device drive shaft (510) will possibly be constructed of steel.

Illustrated in FIG. 4C is the bushing receptacle body interior diameter (110) which is greater than the bushing ring cap diameter (610). The bushing receptacle seal location diameter (121) is greater than the bushing receptacle body interior diameter (110) and is greater than the seal outside diameter (711). The bushing cap diameter (321) is less than or equal to the bushing ring cap diameter (610), The driven device drive shaft diameter (511) is less than the bushing drive shaft aperture diameter (310) and the seal aperture diameter (710) and is sealing fitted to the seal aperture (740).

Seen in FIG. 4C is the bushing ring cap diameter (610) is less than the bushing receptacle body interior diameter (110) and the bushing ring (600) is friction or key secured within the bushing receptacle (100) from rotation relative to the bushing receptacle (100). The preferred method of eliminating rotation between the bushing receptacle (100) and the bushing ring (600) is by friction fit. However, those of ordinary skills in the rotation prevention arts will know that friction and key methods are used to eliminate rotation between such elements.

Also seen in FIG. 4C is that the bushing (300) is irremovably affixed to the bushing ring (600) with at least one threaded bushing machine cap bolt (323) via a bushing machine bolt hole (322) aligned with a bushing ring cap machine bolt hole (622) and the interconnected bushing (300) and the bushing ring (600) are inserted into the bushing receptacle body interior (113). The bushing taper body (330) is split with a bushing taper body split (336) which extends from bushing cap top surface (626) through the bushing taper body (330). The bushing taper body split (336) allows the bushing (300) to be compressed and to expand as the bushing (300) is irremovably affixed in the bushing ring (600). The bushing ring body (630) has a bushing ring interior body taper (637) and is tapered at the interior. The bushing ring body (630) is split with a bushing ring body split (636) from bushing ring cap top surface to through the bushing ring cap bottom surface (628) allowing the bushing ring (600) to be compressed and to expand. The bushing ring cap exterior (629) is parallel to the bushing receptacle body interior (113). The interconnection of the bushing (300) and the bushing ring (600) draws the bushing taper body (330) into contact with the bushing ring interior body taper (630). As the at least one threaded bushing machine cap bolt (323) is tightened the bushing taper body split (336) is compressed and the bushing taper body split (636) is expanded thereby urging the bushing ring cap exterior (629) into friction and rotation resistant contact with the bushing receptacle body interior (113).

As additionally illustrated in FIG. 4C, the seal outside diameter (711) is less than the bushing receptacle seal location diameter (121) and is greater than the bushing cap diameter (321). The seal (700) is received into the bushing receptacle seal location (117) with a sealing fit. The driven device drive shaft (510) is sealingly inserted through the seal aperture (740) and through the bushing drive shaft aperture (340). The driven device drive shaft (510) is friction and rotation resistant by the compressed bushing taper body split (336) when combined with the bushing ring (600). The driven device drive shaft (510) is illustrated as extending from the driven device (500).

Also illustrated in FIG. 4C is the bushing receptacle bushing ring stop (119) and the bushing receptacle interior bottom (123). The bushing ring cap diameter (610) is greater than the bushing receptacle interior bottom diameter (122). The combined bushing (300) and bushing ring (600) may be inserted into the bushing receptacle (100) and into contact with the bushing receptacle bushing ring stop (119). The driven device drive shaft (510) is sized to pass through the seal aperture (740), the bushing drive shaft aperture (340), bushing ring drive shaft aperture (640) and into the bushing receptacle body interior (113) and into contact with the bushing receptacle interior bottom (123). When the bushing (300) is affixed to the bushing ring (600) with at least one bushing cap machine bolt (323) received by at least one bushing ring cap push bolt tapped hole (624), the bushing cap diameter (321) is lessened and the bushing drive shaft aperture (340) is compressed against the driven device drive shaft (510) thereby creating a friction fit inhibiting rotation of the driven device drive shaft (510) relative to the bushing (300). When the bushing (300) is affixed to the bushing ring (600) with at least one bushing cap machine bolt (323) received by at least one bushing ring cap push bolt tapped hole (624), the bushing ring cap diameter (610) is increased thereby compressing the bushing ring cap exterior (629) into contact with the bushing receptacle bushing receptacle body interior (113) thereby creating a friction fit inhibiting rotation of the bushing ring (600) relative to the bushing receptacle (100).

The invention claimed is:

1. A splint joint (1) for a shaft comprising:
   a bushing receptacle (100) having a bushing receptacle body (110); said bushing receptacle (100) having a bushing receptacle body exterior (112), a bushing receptacle body tapered interior (114), a bushing receptacle top (116), a bushing receptacle bottom (118) distal from the said bushing receptacle top (116), a generally planar bushing receptacle mating surface (120) at the said bushing receptacle top (116), at least one bushing receptacle tapped hole (122) at the said bushing receptacle mating surface (120) penetrating the said bushing receptacle body (110); and
   a shaft (200) extending outwardly from and immovably affixed, by a drive shaft connection (230), to the said bushing receptacle bottom (118); said shaft (200) is in alignment with and concentrically sharing a bushing receptacle and shaft center line (140) extending from a bushing receptacle interior (130); and
   a bushing (300) having a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle and shaft center line (140); and
   at least one bushing cap machine bolt hole (322) penetrating the said bushing cap (320) and in alignment with the at least one bushing receptacle tapped hole (122); and
   at least one bushing cap push bolt tapped hole (324) extending from said bushing cap top surface (326) and through the said bushing cap bottom surface (328); the said at least one bushing cap push bolt tapped hole (324) is aligned to contact the said bushing receptacle mating surface (120); and
   a bushing drive shaft aperture (340) is sized to receive a driven device drive shaft (510) and extends from said bushing cap top surface (326) through the said bushing cap bottom surface (328) and is concentrically aligned with the said bushing receptacle and shaft center line (140); and
   a bushing taper body (330) extends outwardly from the said bushing cap bottom surface (328); the bushing taper body (330) is sized to be slidably inserted into and extracted from the bushing receptacle body tapered interior (114); the bushing taper body (330) having a removable friction fit within the bushing receptacle body tapered interior (114); the bushing taper body (330) and the bushing receptacle body tapered interior (114) having generally the same tapered ratio; the said bushing taper body (330) has a spring function allowing a bushing taper body split (336) to close as the said bushing taper body (330) is inserted into the said bushing receptacle body tapered interior (114); and the said bushing cap bottom surface (328) is generally parallel to the said bushing receptacle mating surface (120); the at least one bushing cap machine bolt hole (322) is aligned with the said at least one bushing receptacle tapped hole (122) to receive machine screws and secure the said bushing receptacle (100) and the said bushing (300) from movement relative to the other during rotation; and the at least one bushing cap push bolt tapped hole (324) is positioned so that a tapped push bolt received by the at least one bushing cap push bolt tapped hole (324) will contact the bushing receptacle mating surface (120) and thereby urge the said bushing (300) away from and out of the said bushing receptacle (100) when the splint joint (1) disassembly is required.

2. A splint joint (1) for a shaft depending from claim 1 and further comprising:

the shaft (200) is a drive shaft (200) having a drive shaft key way (210); the said drive shaft (200) is driven by a drive device (400);

the at least one bushing receptacle tapped hole (122) at the said bushing mating surface (120) is at least two bushing receptacle tapped holes (122); and the said at least one bushing cap push bolt tapped hole (324) is at least two bushing cap push bolt tapped holes (324) spaced apart and aligned to contact the said bushing receptacle mating surface (120); and the said bushing drive shaft aperture (340) has a bushing drive shaft aperture key (342) therein to be received into a driven device drive shaft key way (520) of a drive shaft (200) which drives a driven device (500); and the said bushing drive shaft aperture key (342) extends within the said bushing drive shaft aperture (340) from the said bushing cap top surface (326) to the said bushing cap bottom surface (328).

3. A splint joint (1) for a shaft depending from claim 2 and further comprising:

the at least two bushing receptacle tapped holes (122) at the said bushing receptacle mating surface (120) is at least three bushing receptacle tapped holes (122) spaced equidistantly; the said at least one bushing cap push bolt tapped hole (324) is at least two bushing cap push bolt tapped holes (324) spaced apart 180 degrees; and the said drive shaft (200) having a said driven device drive shaft key way (520) will extend into the said bushing taper body (330) from the said bushing cap top surface (326) toward the said bushing cap bottom surface (328) but will terminate distal to the said bushing cap bottom surface (328).

4. A splint joint (1) for a shaft comprising:

a bushing receptacle (100) having a bushing receptacle body (110); said bushing receptacle (100) having a bushing receptacle body exterior (112), a bushing receptacle body interior (114), a bushing receptacle top (116), a bushing receptacle bottom (118) distal from the said bushing receptacle top (116), a generally planar receptacle bushing receptacle mating surface (120) at the said bushing receptacle top (116), at least one bushing receptacle tapped hole (122) from the said bushing receptacle mating surface (120) extending toward the said bushing receptacle bottom (118); and a shaft (200) is extending outwardly from and immovably affixed, by a drive shaft connection (230), at the said bushing receptacle bottom (118); said shaft (200) is in alignment with and concentrically sharing a bushing receptacle and shaft center line (140) extending from bushing receptacle interior (130); and a bushing (300) having a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle and shaft center line (140); and at least one bushing cap machine bolt hole (322) extending through the said bushing cap (320) and in alignment with the at least one bushing receptacle tapped hole (122); and at least one bushing cap push bolt tapped hole (324) extending from said bushing cap top surface (326) and through the said bushing cap bottom surface (328); the said at least one bushing cap push bolt tapped hole (324) is aligned to contact the said bushing receptacle mating surface (120); and a bushing drive shaft aperture (340) is sized to receive a shaft (200) and extends from said bushing cap top surface (326) through the said bushing cap bottom surface (328) and is concentrically aligned with the said bushing receptacle and shaft center line (140); and the said bushing cap bottom surface (328) is generally parallel to the said bushing receptacle mating surface (120); the at least one bushing cap machine bolt hole (322) is aligned with the said at least one bushing receptacle tapped hole (122) to receive machine screws and secure the said bushing receptacle (100) and the said bushing (300) from movement relative to the other during rotation; and the at least one bushing cap push bolt tapped hole (324) is positioned so that a threaded push bolt received by the at least one bushing cap push bolt threaded hole (324) will contact the bushing receptacle mating surface (120) and thereby urge the said bushing (300) away from and out of the said bushing receptacle (100) when the splint joint (1) disassembly is required.

5. A splint joint (1) for a shaft depending from claim 4 and further comprising:

the shaft (200) is a drive shaft (200) having a drive shaft key way (210); the said drive shaft (200) is driven by a drive device (400);

the at least one bushing receptacle tapped hole (122) at the said bushing receptacle mating surface (120) is at least two bushing receptacle tapped holes (122); and the said at least one bushing cap push bolt tapped hole (324) is at least two bushing cap push bolt tapped holes (324) spaced apart and aligned to contact the said bushing receptacle mating surface (120); and the said bushing drive shaft aperture (340) has a bushing drive shaft aperture key (342) therein to be received into a driven device drive shaft key way (520) of a driven device drive shaft (510) which drives a driven device (500); and the said bushing drive shaft aperture key (342) extends within the said bushing drive shaft aperture (340) from the said bushing cap top surface (326) to the said bushing cap bottom surface (328).

6. A splint joint (1) for a shaft depending from claim 5 and further comprising:

the at least two bushing receptacle tapped holes (122) at the said (120) are at least three bushing receptacle tapped holes (122) equidistantly spaced; and and the said at least one bushing cap push bolt tapped hole (324) is at least two bushing cap push bolt tapped holes (324) spaced apart; and the said drive shaft (200) having a said driven device drive shaft key way (520) will extend no further into the said bushing taper body (330) than from the said bushing cap top surface (326) to the said bushing cap bottom surface (328).

7. A splint joint (1) for a shaft depending from claim 6 and further comprising:

the at least two bushing receptacle tapped holes (122) at the said bushing receptacle mating surface (120) is at least three bushing receptacle tapped holes (122) spaced equidistantly; and the said bushing receptacle tapped holes (122) are parallel with the said bushing receptacle and shaft center line (140); and the said at least two bushing cap push bolt tapped holes (324) are spaced apart 180 degrees; and the bushing receptacle body interior (114) is tapered; and a bushing taper body (330) extends outwardly from the said bushing cap bottom surface (328); the said bushing taper body (330) is sized to be slidably inserted into and extracted from the bushing receptacle body tapered interior (114); the bushing taper body (330) having a removable friction fit within the bushing receptacle body tapered interior (114); the bushing taper body (330) and the bushing receptacle body tapered interior (114) having generally the same tapered ratio; the said bushing taper body (330) has a spring function allowing a bushing taper body split (336) to close as the said bushing taper body (330) is inserted into the said bushing receptacle body tapered interior (114); the bushing taper body (330) is rigidly affixed to the bushing cap bottom surface (328).

8. A splint joint (1) for a shaft comprising:

a bushing receptacle (100) having a bushing receptacle body (110); said bushing receptacle (100) having a bushing receptacle body exterior (112), a bushing receptacle body interior (113), a bushing receptacle top (116), a bushing receptacle bottom (118) distal from the said bushing receptacle top (116); and a shaft (200) extending outwardly from and immovably affixed, by a drive shaft connection (230), to the said bushing receptacle bottom (118); the shaft (200) is in alignment with and concentrically sharing a bushing receptacle and shaft center line (140) extending from a bushing receptacle center (140) at the said bushing receptacle interior (130);

the bushing receptacle body interior (113), proximal the bushing receptacle top (116) is sized to receive a bushing ring (600) having a bushing ring cap (620), a bushing ring cap top surface (626), a bushing ring cap bottom surface (628), the bushing cap top surface (326) and the bushing cap bottom surface (328) are generally orthogonal to the bushing receptacle and shaft center line (140); at least one bushing ring cap machine bolt hole (622) extending from the bushing ring cap top surface (626) toward the bushing ring cap bottom surface (628) is parallel with the bushing receptacle and shaft center line (140), the at least one bushing ring cap machine bolt hole (622) is threaded; and a bushing ring drive shaft aperture (640) is concentric with the shaft center line (140); a bushing ring interior body (630) is tapered; a single bushing ring body split (636) extends from the bushing ring cap top surface (626) through the bushing ring body (630); the bushing ring (600) has a spring function; and a bushing (300) having a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle body interior (113) and shaft center line (140); at least one bushing cap machine bolt hole (322) from the bushing cap top surface (326) through the bushing cap bottom surface (328) is aligned with the at least one bushing ring cap machine bolt hole (622) to receive machine devices to secure the said bushing ring (600) and the bushing (300) from movement relative to the other during rotation; and the bushing (300) has a bushing drive shaft aperture (340) which is sized to receive a driven device drive shaft (510) and is concentrically aligned with the said bushing receptacle and shaft center line (140); and a bushing taper body (330) extends outwardly from the said bushing cap bottom surface (328); the bushing taper body (330) is sized to be slidably inserted into and extracted from a bushing ring interior body taper (637); the bushing taper body (330) and the bushing ring interior body taper (637) having generally the same tapered ratio; the said bushing taper body split (336) is proximal the said bushing cap bottom surface (328) and is wider distal to the said bushing cap bottom surface (328); the said bushing taper body (330) has a spring function allowing the bushing taper body split (336) to close as the said bushing taper body (330) is inserted into the said bushing ring interior body taper (637); and the bushing taper body (330) having a irremovably friction fit within the bushing ring interior body taper (637) when the at least one bushing cap machine bolt (323) extends into and is tightened into the at least one bushing ring cap machine bolt hole (622); the bushing (300) and the bushing ring (600) having a rotation resistant and removable friction fit with the bushing receptacle body interior (113) when the at least one bushing cap machine bolt (323) is tightened; and a bushing ring cap diameter (610) is greater than the bushing receptacle interior bottom diameter (122); the combined bushing (300) and bushing ring (600) is inserted into the bushing receptacle (100) and into contact with the bushing receptacle bushing ring stop (119); the driven device drive shaft (510) is sized to pass through a seal aperture (740), the bushing drive shaft aperture (340), bushing ring drive shaft aperture (640) into the bushing receptacle body interior (113) and into contact with the bushing receptacle interior bottom (123); when the bushing (300) is affixed to the bushing ring (600) with at least one bushing cap machine bolt (323) received by at least one bushing ring cap push bolt tapped hole (624), the bushing cap diameter (321) is lessened and the bushing drive shaft aperture (340) is compressed against the driven device drive shaft (510) thereby creating a friction fit inhibiting rotation of the driven device drive shaft (510) relative to the bushing (300); when the bushing (300) is affixed to the bushing ring (600) with at least one bushing cap machine bolt (323) received by at least one bushing ring cap push bolt tapped hole (624), the bushing ring cap diameter (610) is increased thereby expanding the bushing ring cap exterior (629) into contact with the bushing receptacle body interior (113) thereby creating a friction fit inhibiting rotation of the bushing ring (600) relative to the bushing receptacle (100); and at least one threaded bushing cap push bolt tapped hole (324) extends from the bushing cap top surface (326) through the bushing cap bottom surface (328) and is positioned so that at least one threaded push bolt contacts the bushing ring cap (620) and thereby urges the said bushing (300) away from and out of contact with the bushing ring cap top surface (626) when the splint joint (1) disassembly is required.

\* \* \* \* \*